(12) United States Patent
Basnayake

(10) Patent No.: US 8,718,917 B2
(45) Date of Patent: May 6, 2014

(54) GPS-BASED RELATIVE POSITIONING ENHANCEMENT METHOD USING NEIGHBORING ENTITY INFORMATION

(75) Inventor: Chaminda Basnayake, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 771 days.

(21) Appl. No.: 12/899,599

(22) Filed: Oct. 7, 2010

(65) Prior Publication Data

US 2012/0089319 A1    Apr. 12, 2012

(51) Int. Cl.
   *G01S 19/51* (2010.01)
(52) U.S. Cl.
   USPC .......................... 701/300; 340/903; 701/301
(58) Field of Classification Search
   USPC .................. 701/300, 301, 470; 340/903, 902
   See application file for complete search history.

(56) References Cited

U.S. PATENT DOCUMENTS

| | | | |
|---|---|---|---|
| 5,323,322 A * | 6/1994 | Mueller et al. ................ | 701/471 |
| 2001/0018636 A1 * | 8/2001 | Mizuno ........................ | 701/207 |
| 2002/0022927 A1 * | 2/2002 | Lemelson et al. ............ | 701/301 |
| 2002/0027524 A1 * | 3/2002 | Pippin ....................... | 342/357.08 |
| 2004/0008138 A1 * | 1/2004 | Hockley et al. ........... | 342/357.09 |
| 2004/0049343 A1 * | 3/2004 | Yamadaji et al. ............. | 701/301 |
| 2004/0193372 A1 * | 9/2004 | MacNeille et al. ........... | 701/213 |
| 2007/0159388 A1 * | 7/2007 | Allison et al. ........... | 342/357.09 |
| 2011/0037646 A1 * | 2/2011 | Tajima et al. ............ | 342/357.26 |
| 2011/0054790 A1 * | 3/2011 | Kagawa et al. ............... | 701/214 |

FOREIGN PATENT DOCUMENTS

| | | | |
|---|---|---|---|
| WO | 2008/145462 A1 | 12/2008 | |
| WO | WO 2008145462 A1 * | 12/2008 | |

\* cited by examiner

*Primary Examiner* — Stephen Holwerda

(57) ABSTRACT

A method and system is provided for determining a relative position between a host vehicle and a remote vehicle using an indirect assisting entity technique. A GPS position of the host vehicle and a remote vehicle are obtained. A number of common satellites providing GPS data to the host vehicle and the remote vehicle are determined. An indirect-assisting entity is identified having a common number of satellites in communication between the host vehicle and remote vehicle, respectively, which is greater than the number of common satellites between host vehicle and the remote vehicle. A relative position is determined between the host vehicle and the indirect-assisting entity, and the remote vehicle and the indirect-assisting entity. A position of the host vehicle relative to the remote vehicle is determined as a function of the determined position of the host vehicle and remote vehicle relative to the indirect-assisting entity.

20 Claims, 4 Drawing Sheets

US 8,718,917 B2

GPS-BASED RELATIVE POSITIONING ENHANCEMENT METHOD USING NEIGHBORING ENTITY INFORMATION

BACKGROUND OF INVENTION

An embodiment relates generally to GPS-assisted positioning.

Global Positioning System (GPS) or other Global Navigation Satellite System (GNSS) receivers operate by tracking line of sight signals. These receivers typically require at least four or more satellites to be continuously available in an unobstructed line of sight of a satellite receiver on a vehicle. Due to natural and man-made obstructions (e.g., buildings) or natural obstructions (i.e., dense tree cover), the optimum number of satellites required to accurately determine a position of the satellite receiver may not be available under certain conditions. Other errors such as orbital errors of a satellite, poor geometry, atmospheric delays, multi-path signals, or clock errors may require more than a minimum required number of satellites available to accurately determine the position of the receiver. Determining relative positioning between two vehicles based on their respective GPS positions and measurements may also be inaccurate if the two vehicles have obstructions where a requisite number of common satellites are not available. Having only common satellites for relative position estimation can increase the accuracy of the relative position as it minimizes errors that are the results of measurement data from different satellites. What is needed is a method and system for overcoming the issue when a common number of satellites required for relative positioning between at least two vehicles are not present.

SUMMARY OF INVENTION

An advantage of an embodiment is using a third party entity as a pseudo-assistant having better sky/satellite visibility to improve relative GPS positions between a host vehicle and a remote vehicle. The technique described herein minimizes GPS data errors that would otherwise be present if relative GPS positions between the vehicles were determined utilizing less than an optimum number of satellites common to both vehicles. The host vehicle can search and select a pseudo-assistant vehicle or multiple pseudo-assistant vehicles having a highest number of common satellites with both the host vehicle and the other communicating entity for minimizing GPS positioning errors, when less than the optimum number of common satellites are present.

An embodiment contemplates a method of determining relative positioning between a host vehicle and a remote vehicle using an indirect assisting entity technique. GPS data of the host vehicle is obtained that includes a GPS position of the host vehicle. The host vehicle obtains GPS data of the remote vehicle that includes a GPS position of the remote vehicle and a confidence estimate of the GPS position of the remote vehicle. A number of common satellites receiving GPS data between the host vehicle and the remote vehicle is determined. A determination is made whether the number of common satellites exceeds a predetermined common satellite threshold. An indirect-assisting entity is identified having a common number of satellites in communication with the host vehicle that is greater than the number of common satellites between host vehicle and the remote vehicle, and having a common number of satellites in communication with the remote vehicle greater than the number of common satellites between host vehicle and the remote vehicle. A relative position between the host vehicle and the indirect-assisting entity is determined and a relative position between the remote vehicle and the indirect-assisting entity is determined. A position of the host vehicle relative to the remote vehicle is determined as a function of the determined position of the host vehicle and remote vehicle relative to the indirect-assisting entity.

An embodiment contemplates a vehicle positioning system that includes a host vehicle global positioning system for determining a GPS position of a host vehicle, and a vehicle-to-entity communication system of the host vehicle for exchanging GPS data with a remote vehicle and an indirect-assisting entity. The GPS data of the remote vehicle includes a GPS position of the remote vehicle and a confidence estimate of the remote vehicle GPS position. A processing unit of the host vehicle determines relative positioning between the host vehicle and the remote vehicle as a function of a GPS data of the host vehicle, the GPS data of the remote vehicle, and the GPS data of the indirect-assisting entity. The processing unit determines a number of common satellites between the host vehicle and the remote vehicle receiving GPS data. The processing unit determines whether the number of common satellites exceeds a predetermined common satellite threshold. The processing unit identifies an indirect-assisting entity in response to the number of common satellites being less than the predetermined common satellite threshold. The indirect-assisting entity has a common number of satellites with the host vehicle that is greater than the number of common satellites between host vehicle and the remote vehicle. The indirect-assisting entity has a common number of satellites with the remote vehicle that is greater than the number of common satellites between host vehicle and the remote vehicle. The processing unit determines both a relative position of the remote vehicle in relation to the indirect-assisting entity and a relative position between host vehicle and the indirect-assisting entity. A position of the host vehicle relative to the remote vehicle is determined as a function of the determined position of the host vehicle and the remote vehicle relative to the position of the indirect-assisting entity.

DETAILED DESCRIPTION

Figure 1:
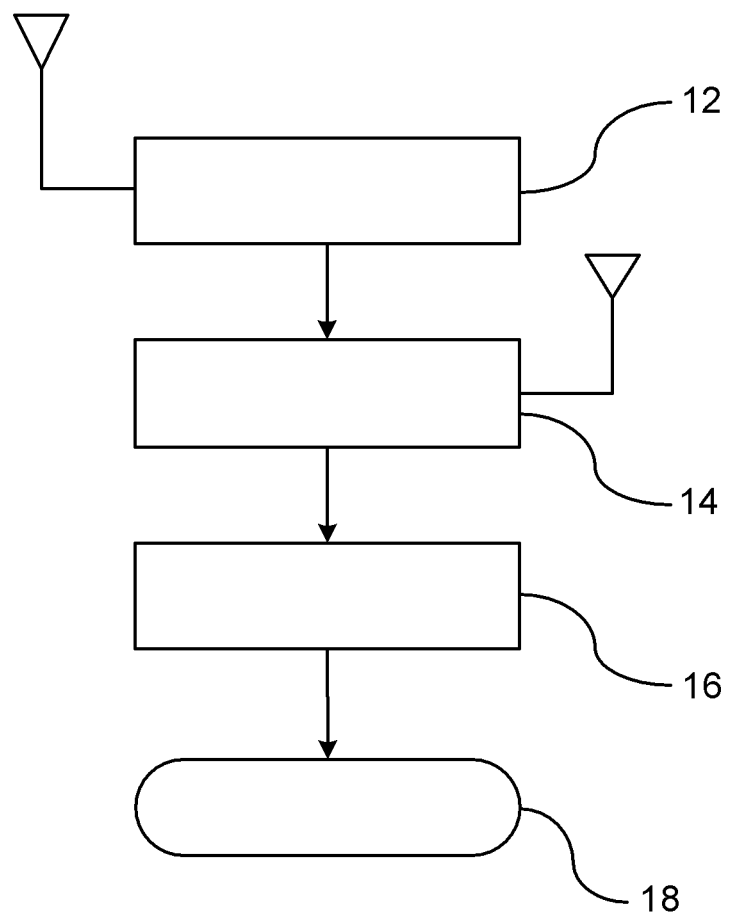
FIG. 1 is a block diagram of the vehicle positioning system.

There is shown in FIG. 1, a block diagram of the vehicle positioning system 10 for a host vehicle. The vehicle positioning system 10 includes an onboard Global Navigation Satellite System (GNSS) 12 receiver or other Global Positioning System (GPS) receiver. It should be understood that the term GNSS and GPS are used herein are interchangeable. A GNSS system includes a global positioning satellite constellation that includes at least 24 or more satellites orbiting the earth in a predetermined path of travel continuously transmitting time marked data signals. A GNSS receiver operates by tracking line of sight signals. These receivers typically require at least four or more satellites to be continuously available in an unobstructed line of sight of a satellite receiver on a vehicle. The GNSS receivers receive the transmitted data and use this information to determine its absolute position. In viewing the earth in a two dimensional plane, each point on the earth is identified by two coordinates. The first coordinate represents latitude and the second coordinate represents a longitude. To determine a position in the two dimensional plane, at least three satellites are required as there are three unknowns in a 3D case where there are 3 position unknowns, two position unknowns and the receiver clock timing error which also treated as an unknown. Some receivers may assume that the altitude stays the same for short duration such that position can be determined with only three satellites; however, if altitude is taken into consideration which is the case for most applications, then at least a minimum of four satellites are required to estimate an absolute position with a certain amount of error. By using four or more satellites, an absolute position in a three dimensional space can be determined that includes the height above and below the earth's surface (e.g., sea level).

Satellite receivers operate by tracking line of sight signals which requires that each of the satellites be in view of the receiver. By design, GNSS or other GPS systems ensure that on average, four or more satellites are continuously in the line of sight of a respective receiver on the earth; however, due to urban canyons (i.e., obstructions such as buildings) or driving next to a truck, a lower number of satellites may be in the line of sight, which is otherwise required to accurately determine the position of the satellite receiver.

The vehicle positioning system 10 further includes a V2X communication system 14. V2X communications include vehicle-to-vehicle (V2V) communication with other vehicles having GPS coverage and vehicle-to-infrastructure (V2I) communications that include roadside units (RSU)/beacons with GPS coverage. Other V2X systems include other road users such as pedestrians, cyclists, any other personal mobility platform. The V2X communication system is a co-operative system based on two-way communications for interacting in real time. These systems are preferably directed at traffic management, collision warning, and collision avoidance systems. Such systems can extend a host vehicle's range of awareness of environmental conditions by providing relevant information regarding the status of traffic in addition to any safety related events occurring in proximity to those vehicles neighboring the host vehicle.

The host vehicle and the communicating entities within a V2X communication system broadcasts V2X wireless messages to one another over a respective inter-vehicle communication network, such as a dedicated short range communication protocol (DSRC). The V2X wireless message may be transmitted as a standard periodic beacon message. The wireless message includes data about a vehicles latitude and longitude position (GPS position), environmental awareness conditions relating to vehicle positions, vehicle kinematics/dynamic parameters, and traffic or road events sensed by respective remote vehicles. These environmental awareness conditions are communicated between vehicles to forewarn drivers of vehicles of some type of safety condition, traffic delays, accident, or current condition that could result in an accident. One of the objectives is to provide advance warning to neighboring vehicles of a condition so as to provide additional time to react to the condition. Such warnings for environmental awareness conditions may include, but are not limited to, traffic congestion, accidents, forward collision warnings (FCW), lateral collision warning (LCW), lane departure warning (LDW), slow/stopped vehicles ahead, emergency electronic brake light activation (EEBL), intersection collision warning/avoidance, straight crossing path, working zone warning, blind spot/lane change, and visibility enhancement of pedestrians/cyclists. Successful execution of such applications as described herein depends on the accuracy of the determined GNSS or GPS measurement data of the communicating vehicles. Errors in the determined positions greatly influence the vehicle application using the vehicle position data. As a result, the objective is to minimize errors in measurement data between the host vehicle and a remote entity. To determine the relative positioning between the host vehicle and a respective remote entity, and reduce errors as described above, it is important that an optimum number of common satellites are utilized in determining a relative position between the host vehicle and a remote entity. That is, if the host vehicle and the remote entity do not share common satellites, then positioning errors may be present resulting in inaccurate assessment of the remote entities position (e.g., error may be greater than several tens of meters). Moreover, if the GNSS or GPS receivers of the host vehicle and remote vehicle are of different types, different configuration, or different hardware then bias in the form of error may be even more pronounced. Bias due to different receivers may be the result of receiver hardware/software characteristics as well as a manufacturer's proprietary algorithms and hardware.

The vehicle positioning system further includes on-board processor 16 for receiving GPS data and other related data for use with vehicle applications 18 such as those described above to forewarn a driver. The on-board processor 16 receives the V2X message that includes the GPS position and measurement data of a remote entity and determines relative positions between the host vehicle and the surrounding remote entities.

Figure 2:
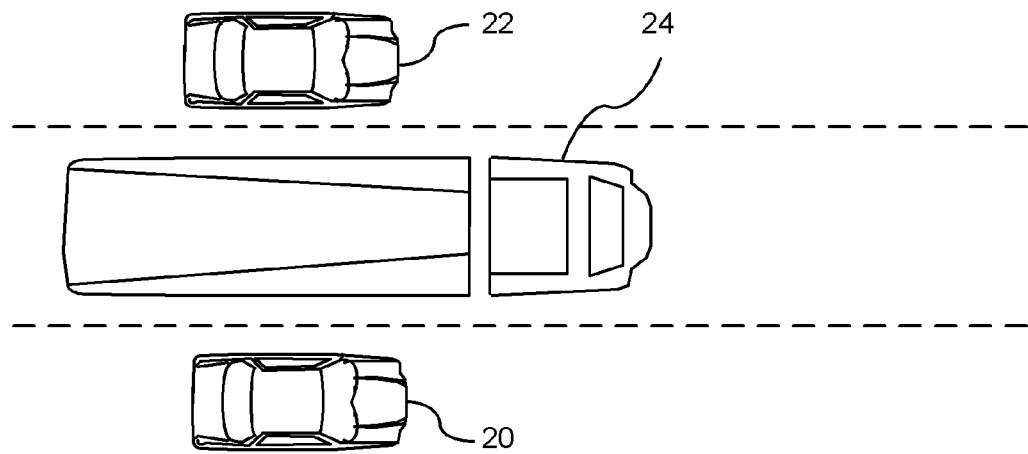
FIG. 2 is a diagrammatic top view of an obstruction positioned between a host vehicle and a remote entity.
Figure 3:
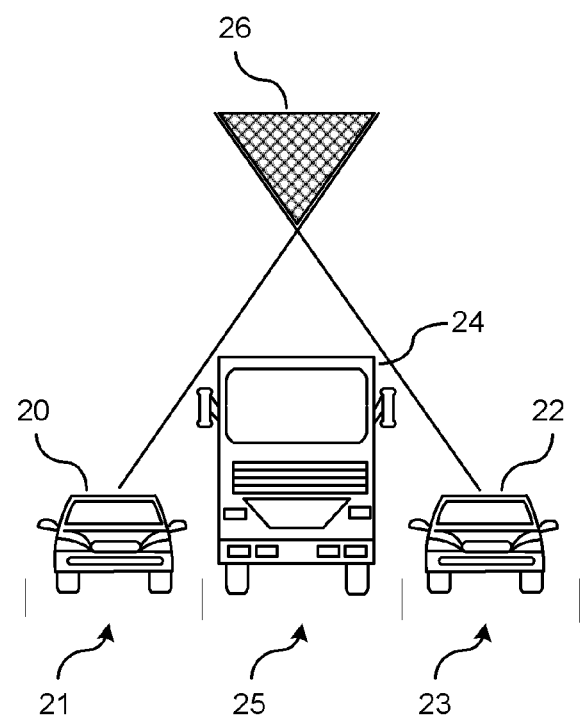
FIG. 3 is a diagrammatic front view of the obstruction positioned between a host vehicle and a remote entity.

FIGS. 2 and 3 illustrate diagrammatic views where obstructions are present resulting in less than an optimum number of common satellites between a host vehicle and a remote entity. A host vehicle 20 is shown driving in a right lane 21 of a vehicle road. A remote vehicle 22 is shown driving in a left lane 23 of the vehicle road. A third vehicle 24, such as a semi-truck, is shown driving in a center lane 25 and is positioned between the host vehicle 20 and the remote vehicle 22.

As shown in FIG. 3, due to the height of the semi-truck 24, only a partial sky is visible for both the host vehicle 20 and the remote vehicle 22. The cross-section area 26 illustrates the region of the sky that has common line-of-sight capability of the host vehicle 20 and the remote vehicle 22 since GPS signals must function on a line of sight. That is, due to the obstruction of the semi-truck 24 affecting the line of sight of the host vehicle 20 and the remote vehicle 22, satellites common to both vehicles must be located in the cross-sectioned region 26 for error reduction. Therefore, to minimize the positioning errors of the GPS or GNSS between the two vehicles, the optimum number of common satellites must be located within this cross-section region 26 to determine a relative position between the vehicles.

Figure 4:
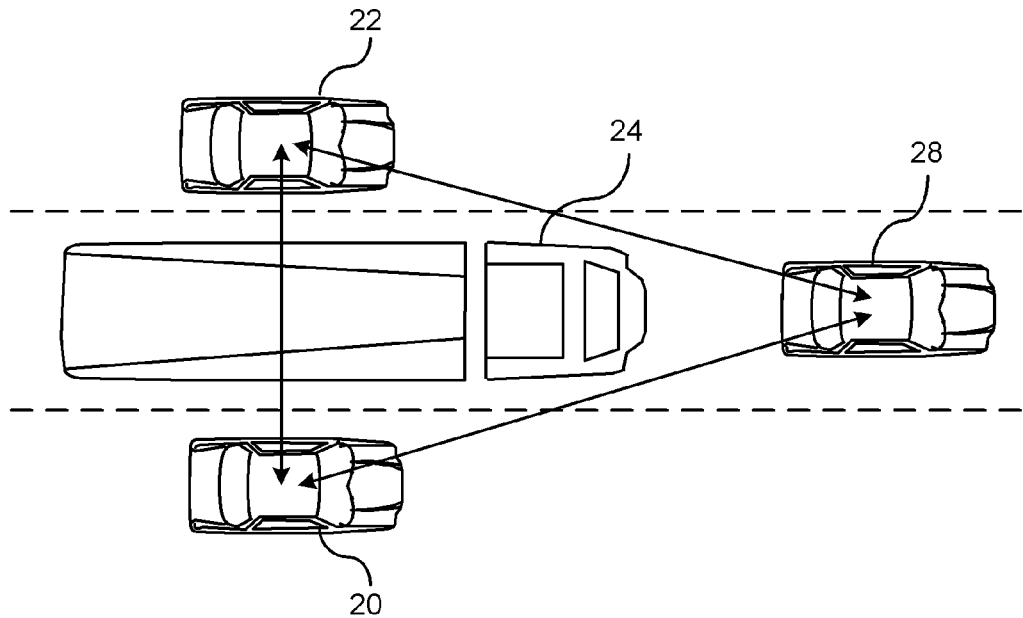
FIG. 4 is a diagrammatic view of vehicles utilizing an indirect-assisting entity position technique.

FIG. 4 illustrates a diagrammatic view utilizing an indirect-assisting entity position technique. There is shown in FIG. 4 the host vehicle 20, the remote vehicle 22, the semi-truck 24, and an indirect-assisting entity 28. The indirect-assisting entity 28 has an open sky view such that no obstructions are present on either side of the indirect-assisting entity 28. As a result, the indirect-assisting entity 28 can receive GPS signals from each of the satellites that the host vehicle 20 receives. The indirect-assisting entity 28 can also receive GPS signals from each of the satellites that the remote vehicle 22 receives.

The on-board processor of the host vehicle utilizes GPS measurement data of the indirect-assisting entity 28 to indirectly determine the GPS position of the remote vehicle 22. That is, the indirect-assisting entity 28 is used as an intermediate point in determining the GPS position of the remote entity.

To determine the position of the host vehicle 20 relative to the indirect-assisting entity 28 and the remote vehicle 22, a differential GPS technique may be utilized. The concept of differential GPS is the use of two receivers, one by a known location or by a location assumed to be known and one by an unknown location (common errors in which needs to be corrected with respect to the one by the known location) that sees GPS satellites in common. By fixing the location of one of the receivers, the other location may be found (or bias corrected) either by computing the corrections to the position of the unknown receiver or by computing corrections to the biased receiver. In reference to the host vehicle and remote entities shown in FIG. 3, the indirect-assisting entity 28 is considered the known location since this entity has an open view of the entire sky and isn't limited to a respective sector of the sky. The host vehicle 20 is considered a receiver having a bias since the host vehicle is limited to satellites in a respective sector of the sky. The remote vehicle 22 is also considered a receiver having a bias since the remote vehicle is limited to satellites in a respective sector of the sky.

The advantage of the embodiment described herein is to allow the host vehicle to search for an indirect-assisting entity that has more satellites in common with each vehicle, respectively, than the number of satellites in common directly between the host vehicle and the remote vehicle. Moreover, the host vehicle may search for any entity in communication range of the host vehicle that has the largest number of satellites in common with each respective vehicle. The greater the number of satellites in communication with a vehicle increases the accuracy of the relative positions between the host vehicle and the remote vehicle.

Once an indirect-assisting entity is identified, a position of the host vehicle 20 is determined relative to the indirect-assisting entity 28. In addition, a position of the remote vehicle 22 is determined relative to the indirect assisting entity 28. Since the determined positions of the host vehicle and the remote vehicle have a common GPS position from which to estimate their location from, the relative positions between the host vehicle 20 and the remote vehicle 22 are established with reduced errors. It is understood that the satellites seen by the host vehicle 20 and the satellites seen by the remote vehicle 22 are not required to be the same satellites; rather, the requirement is that the indirect-assisting entity 28 must see those common satellites used by the host vehicle 20 to determine the host vehicle position and must also see those satellites used by the remote vehicle 22 to determine the remote vehicle position.

Figure 5:
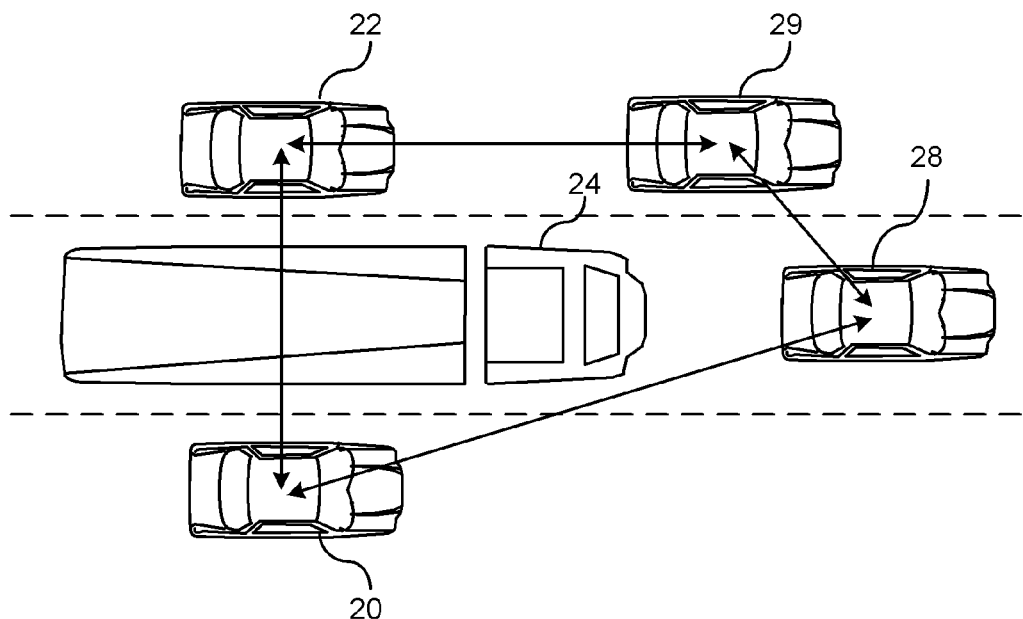
FIG. 5 is a diagrammatic view of vehicles utilizing an multiple indirect-assisting entity technique
Figure 6:
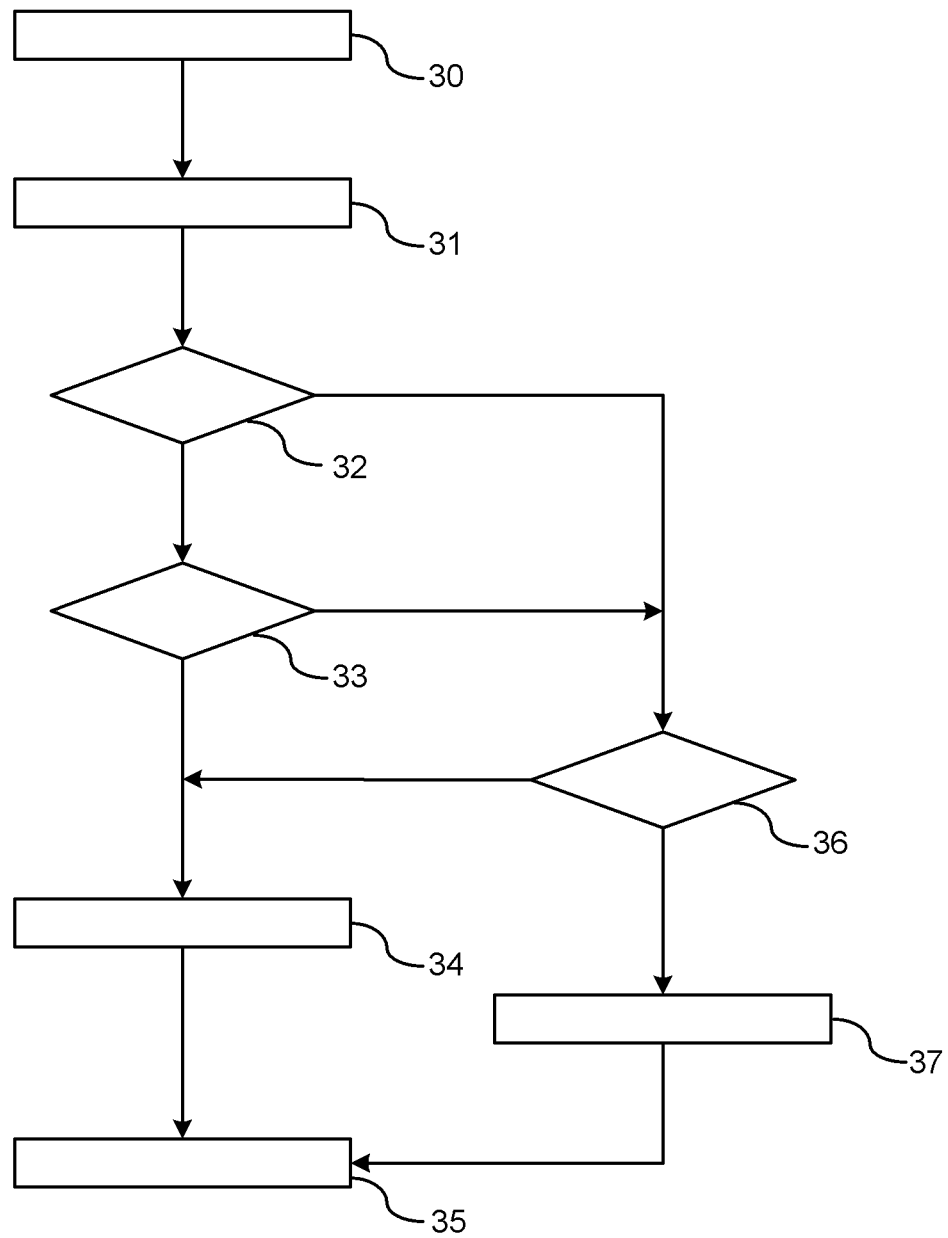
FIG. 6 is a flowchart for a method of an indirect assisting entity position technique.

FIG. 5 illustrates a diagrammatic view utilizing an indirect-assisting entity position technique utilizing a plurality of indirect-assisting entities. A plurality of indirect-assisting entities may be used when the host vehicle cannot locate a single indirect assisting entity that can establish a linking relationship having a common number of satellites greater the preferred number of common satellites or greater than the common number of satellites between the host vehicle 20 and the remote vehicle 22. In this embodiment, the host vehicle 20 can establish a chain of indirect assisting entities that links common satellites to the remote vehicle 22.

In an example utilizing multiple indirect-assisting entities, the host vehicle 20 has a line of sight with satellites 1s, 2s, 3s, 4s, 5s, 6s. The remote vehicle 22 has a line of sight with satellites 7s, 8s, 9s, 10s, 11s. As a result, there are no common satellites. Indirect-assisting entity 28 has a line of sight with satellites 1s, 2s, 3s, 4s, 8s. Indirect-assisting entity 28 has 4 satellites in common with the host vehicle 20, which is the preferred number of common satellites to minimize GPS errors; however, indirect assisting entity 28 has only one satellite in common with remote vehicle 22. Although the number of satellites established between the indirect-assisting entity 28 and the remote vehicle 22 is greater than the number of common satellites between the host vehicle 20 and the remote vehicle 28, the indirect assisting entity technique can be used to look for a plurality of satellites to establish a common satellite chain that will provide at least the preferred number of satellites to minimize errors (e.g., 4 common satellites). The host vehicle 20 is also in communication with indirect-assisting entity 29, which has satellites 1s, 2s, 3s, 8s, 9s, 10s, 11s in its line of sight. Although indirect-assisting entity 29 has 4 satellites in common with the remote vehicle 22, indirect-assisting entity 29 has only 3 satellites in common with the host vehicle 20 which is less than the preferred number of common satellites. By utilizing both indirect-assisting entities 28 and 29, a chain is formed with each vehicle having at least 4 satellites in common with a directly preceding vehicle and a directly succeeding vehicle. For example, utilizing the satellites that each vehicle has in its line of sight as described above, the host vehicle 20 and indirect-assisting entity 28 has 4 satellites in common (i.e., satellites 1s, 2s, 3s, 4s). Indirect-assisting entity 28 has 4 satellites in common with indirect-assisting entity 29 (i.e., satellites 1s, 2s, 3s, 8s). Indirect-assisting entity 29 has 4 satellites in common with the remote vehicle 22 (i.e., satellites 8s, 9s, 10s, 11s). As a result, a chain is formed that has 4 satellites in common between each link (i.e., between each juxtaposed vehicle). It should be understood that any number of indirect-assisting entities can be used to establish a chain that provides the preferred number of common satellites.

It should also be understood that an number of common satellites less than the optimum number of satellites, but greater than the number of common satellites between the host vehicle and remote vehicle, if a chain having the preferred number of common satellites cannot be establish. In such an example, the host vehicle will establish a position error factor relating to the inaccuracy of the GPS data due lower number of satellites, and determine whether it will use the determined relative positions in any of its respective applications.

FIG. 5 illustrates a flowchart of a method for determining a relative position between a host vehicle and a remote vehicle using indirect-assisting vehicle data. In step 30, host GPS data is collected from the on-board GPS unit of the host vehicle. The GPS data includes latitude and longitude data of the host vehicle. Other GPS data includes the number of satellites visible to the host vehicle, GPS measurements such as pseudorange, carrier phase measurements, quality measures such as carrier-to-noise ratios, the identification of the satellites, velocity data of the host vehicle, and the confidence level of the accuracy of the GPS data obtained from the satellites.

In step 31, host GPS data is collected from the on-board GPS unit of the remote vehicle. The data is provided by the remote vehicle to the host vehicle. The GPS data includes latitude and longitude data of the remote vehicle, the number of satellites visible to the remote vehicle, GPS measurements such as pseudorange, carrier phase measurements, quality measures such as carrier-to-noise ratios, the identification of the satellites, velocity data of the remote vehicle, and the confidence level of the accuracy of the GPS data obtained from the satellites and other sensed data obtained by the remote vehicle.

In step 32, a determination is made whether GPS data for the host vehicle and the remote vehicle were obtained from at least a predetermined number of common satellites. Two vehicles obtaining GPS data from the same satellites increase the robustness of the GPS positioning between the two vehicles which reduces GPS positioning errors. If the determination is made that the GPS data for each vehicle was obtained from at least a predetermined number of common satellites, then the routine proceeds to step 33.

In step 33, a determination is made whether the host vehicle is confident with the accuracy of the GPS data provided by the remote vehicle. The host vehicle may make a determination based on the confidence estimates supplied by the remote vehicle or may re-determine the confidence level of the remote GPS data based on the data supplied by the remote vehicle. If the host vehicle is confident with the accuracy of the GPS data estimates provided by the remote vehicle, or confident with its own estimate of the remote vehicle's position, then the routine proceeds to step 34.

In step 34, a relative position of the host vehicle and the remote vehicle is determined using the GPS data measurements acquired directly by the host vehicle and the remote vehicle. Since the determination is made that at least a common number of satellites are used between the host and remote vehicle, then a relative position can be determined using solely the GPS data provided by the two respective vehicles.

In step 35, the relative positions of the host vehicle and the remote vehicle are provided to a host vehicle application to be used by a respective host vehicle application.

In steps 32 or 33, if the determination is made that the host vehicle does not have the optimum number of common satellites, or that the host vehicle is not satisfied with the confidence estimates of the remote vehicle's GPS data, respectively, then the routine proceeds to step 36.

In step 36, a determination is made whether a third remote entity, herein referred to as an indirect-assisting entity, (e.g., vehicle, RSE, or pedestrian) has a higher number of satellites that are seen in common with each of the host vehicle and the remote vehicle. For example, if the determination in step 32 was that the host vehicle and remote vehicle have only 3 satellites in common with one another, then a determination is made whether any indirect-assisting entity has 4 or more satellites in common with each vehicle, respectively. That is, the indirect-assisting entity must have at least 4 satellites in common with the host vehicle, and the indirect-assisting entity must have at least 4 satellites in common with the remote vehicle. In the above example, the indirect-assisting entity could have 4 satellites in common with the host vehicle and 6 satellites in common with the remote vehicle for satisfying the condition. As a result, a greater confidence will be provided by determining GPS positions using the indirect assisting entity position technique in contrast to the direct technique between the host vehicle and the remote vehicle. It should be understood that the host vehicle may search any remote entity for identifying an indirect-assisting entity with a greater number of satellites in common with the host vehicle and remote vehicle. Moreover, if more than one indirect-assisting entity is found that satisfies the criteria, the host vehicle may select the respective indirect-assisting entity that offers the host vehicle the highest reliability for determining the relative position between the host vehicle and the remote vehicle. If the determination is made in step 36 that the an indirect-assisting entity has a higher number of satellites seen in common with each of the host vehicle and the remote vehicle, then the routine proceeds to step 37. If a higher number of common satellites are not seen, the routine proceeds to step 34.

In step 37, the routine uses the indirect-assisting technique to determine the relative position of the host vehicle and remote vehicle.

The position of the remote vehicle relative to the host vehicle may be used to enable a control action. A control action may include displaying the position of the remote vehicle relative to the host vehicle on a display device for use by a driver of the vehicle. The control action may further include using the position to evaluate environmental awareness conditions described earlier, communicating environmental awareness conditions to other vehicles, or providing a warning a driver of the host relating to the vehicle environmental awareness conditions.

While certain embodiments of the present invention have been described in detail, those familiar with the art to which this invention relates will recognize various alternative designs and embodiments for practicing the invention as defined by the following claims.

What is claimed is:

1. A method of determining relative positioning between a host vehicle and a remote vehicle using an indirect assisting entity technique, the method comprising the steps of:
   obtaining Global Positioning System (GPS) data of the host vehicle that includes a GPS position of the host vehicle;
   the host vehicle obtaining GPS data of the remote vehicle that includes a GPS position of the remote vehicle and a confidence estimate of the GPS position of the remote vehicle;
   determining a number of common satellites receiving GPS data between the host vehicle and the remote vehicle;
   determining whether the number of common satellites exceeds a predetermined common satellite threshold;
   in response to the number of common satellites exceeding a predetermined common satellite threshold, identifying a mobile indirect-assisting entity having a common number of satellites in communication with the host vehicle that is greater than the number of common satellites between host vehicle and the remote vehicle, and having a common number of satellites in communication with the remote vehicle greater than the number of common satellites between host vehicle and the remote vehicle;
   determining a relative position between the host vehicle and the mobile indirect-assisting entity and a relative position between the remote vehicle and the mobile indirect-assisting entity; and
   determining a position of the host vehicle relative to the remote vehicle as a function of the determined position of the host vehicle and remote vehicle relative to the mobile indirect-assisting entity.

2. The method of claim 1 wherein a plurality of mobile indirect-assisting entities is used to establish a relative position between the host vehicle and the remote vehicle, wherein the plurality of mobile indirect-assisting entities establishes a common satellite communication chain between the host vehicle and the remote vehicle, wherein each respective mobile indirect-assisting entity within the chain has a common number of satellites with a directly preceding entity in the chain, and a directly succeeding entity in the chain, wherein the common number of satellites between a respective preceding entity in the chain and a respective succeeding entity in the chain is each greater than the common number of satellites between the host vehicle and the remote vehicle.

3. The method of claim 1 further comprising the steps of: the host vehicle determining whether the confidence estimate of the GPS position of the remote vehicle satisfies a predetermined confidence threshold;

determining the relative positions between the host vehicle and the remote vehicle using the GPS position as determined by the host vehicle and the GPS position as determined by the remote vehicle in response to the confidence estimate satisfying the predetermined confidence threshold, otherwise determining the relative positions of the host vehicle and the remote vehicle as a function of the position of the mobile indirect-assisting entity.

4. The method of claim 1 wherein communications between the host vehicle, remote vehicle, and mobile indirect-assisting entity are communicated via an inter-vehicle ad hoc network.

5. The method of claim 1 wherein the mobile indirect assisting entity functions as an intermediate position relative to the position of the host vehicle and the position of the remote vehicle.

6. The method of claim 5 wherein the mobile indirect-assisting entity is a vehicle for providing the intermediate position.

7. The method of claim 5 wherein the mobile indirect-assisting entity is a pedestrian for providing the intermediate position.

8. The method of claim 1 wherein the predetermined common satellite threshold is at least 3 satellites.

9. The method of claim 1 wherein the predetermined common satellite threshold is at least 4 satellites.

10. The method of claim 1 wherein the determined position of the remote vehicle relative to the host vehicle is displayed to a driver of the host vehicle.

11. The method of claim 1 wherein a control action is performed by a vehicle application that uses the determined position of the remote vehicle relative to the host vehicle.

12. The vehicle positioning system comprising:
a host vehicle global positioning system for determining a Global Positioning System (GPS) position of a host vehicle;
a vehicle-to-entity communication system of the host vehicle for exchanging GPS data with a remote vehicle and an mobile indirect-assisting entity, the GPS data of the remote vehicle including a GPS position of the remote vehicle and a confidence estimate of the remote vehicle GPS position; and
a processing unit of the host vehicle for determining relative positioning between the host vehicle and the remote vehicle as a function of a GPS data of the host vehicle, the GPS data of the remote vehicle, and the GPS data of a mobile indirect-assisting entity;
wherein the processing unit determines a number of common satellites between the host vehicle and the remote vehicle receiving GPS data, wherein the processing unit determines whether the number of common satellites exceeds a predetermined common satellite threshold, wherein the processing unit identifies the mobile indirect-assisting entity in response to the number of common satellites being less than the predetermined common satellite threshold, the mobile indirect-assisting entity having a common number of satellites with the host vehicle that is greater than the number of common satellites between host vehicle and the remote vehicle, the mobile indirect-assisting entity further having a common number of satellites with the remote vehicle that is greater than the number of common satellites between host vehicle and the remote vehicle, wherein the processing unit determines both a relative position of the remote vehicle in relation to the mobile indirect-assisting entity and a relative position between host vehicle and the mobile indirect-assisting entity, wherein a position of the host vehicle relative to the remote vehicle is determined as a function of the determined position of the host vehicle and the remote vehicle relative to the position of the mobile indirect-assisting entity.

13. The vehicle positioning system of claim 12 wherein a plurality of mobile indirect-assisting entities is used to establish a relative position between the host vehicle and the remote vehicle, wherein the plurality of mobile indirect-assisting entities establishes a common satellite communication chain between the host vehicle and the remote vehicle, wherein each respective mobile indirect-assisting entity within the chain has a common number of satellites with a directly preceding entity in the chain, and a directly succeeding entity in the chain, wherein the common number of satellites between a respective preceding entity in the chain and a respective succeeding entity in the chain is each greater than the common number of satellites between the host vehicle and the remote vehicle.

14. The vehicle positioning system of claim 12 wherein the vehicle-to-entity communication system is a vehicle-to-vehicle communication system.

15. The vehicle positioning of claim 12 wherein the vehicle-to-entity communication system is a vehicle-to-infrastructure communication system.

16. The vehicle positioning system of claim 12 wherein the mobile indirect-assisting entity is a remote vehicle.

17. The vehicle positioning system of claim 12 wherein the mobile indirect-assisting entity is a device carried by a pedestrian.

18. The system of claim 12 wherein the predetermined common satellite threshold is at least 3 satellites.

19. The system of claim 12 wherein the predetermined common satellite threshold is at least 4 satellites.

20. The system of claim 12 wherein the processing unit determines whether the confidence estimate of the GPS position of the remote vehicle satisfies a predetermined confidence threshold, and wherein the relative positions of the host vehicle and remote vehicle are determined using the GPS position as determined by the host vehicle and the GPS position as determined by the remote vehicle in response to the confidence estimate satisfying the predetermined confidence threshold.

* * * * *